(12) United States Patent
Xu et al.

(10) Patent No.: US 12,248,423 B2
(45) Date of Patent: Mar. 11, 2025

(54) APPARATUS AND METHODS FOR MANAGING OUTSTANDING TRANSACTIONS BETWEEN ONE OR MORE REQUESTING UNITS AND A TARGET UNIT

(71) Applicants: ADVANCED MICRO DEVICES, INC., Santa Clara, CA (US); ATI TECHNOLOGIES ULC, Markham (CA)

(72) Inventors: Buheng Xu, Beijing (CN); Dong Yu, Santa Clara, CA (US); Philip Ng, Markham (CA); Lianji Cheng, Suzhou (CN)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/163,620

(22) Filed: Feb. 2, 2023

(65) Prior Publication Data
US 2024/0264969 A1  Aug. 8, 2024

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS

| 11,899,969 | B1* | 2/2024 | Singer | G06F 3/0604 |
| 2023/0136091 | A1* | 5/2023 | Karkra | G06F 9/467 718/101 |

* cited by examiner

*Primary Examiner* — Farley Abad
*Assistant Examiner* — Dayton Lewis-Taylor

(57) ABSTRACT

An apparatus includes logic circuitry that selects a retag transaction identifier for an original transaction identifier of an incoming transaction request, based on a plurality of sub-groups of retag tracking data. Each sub-group of retag tracking data is associated with a corresponding sub-group of retag transaction identifiers in a group of retag transaction identifiers. The logic circuitry retags the incoming transaction request with the selected retag transaction identifier (ID) by replacing the original transaction identifier associated with the incoming transaction request and sends the retagged incoming transaction request to a target. A returned response is received from the target. The retag transaction ID in the returned response is removed and replaced with the original transaction ID before being sent as a reply to the requesting unit. Associated methods are also presented.

20 Claims, 7 Drawing Sheets

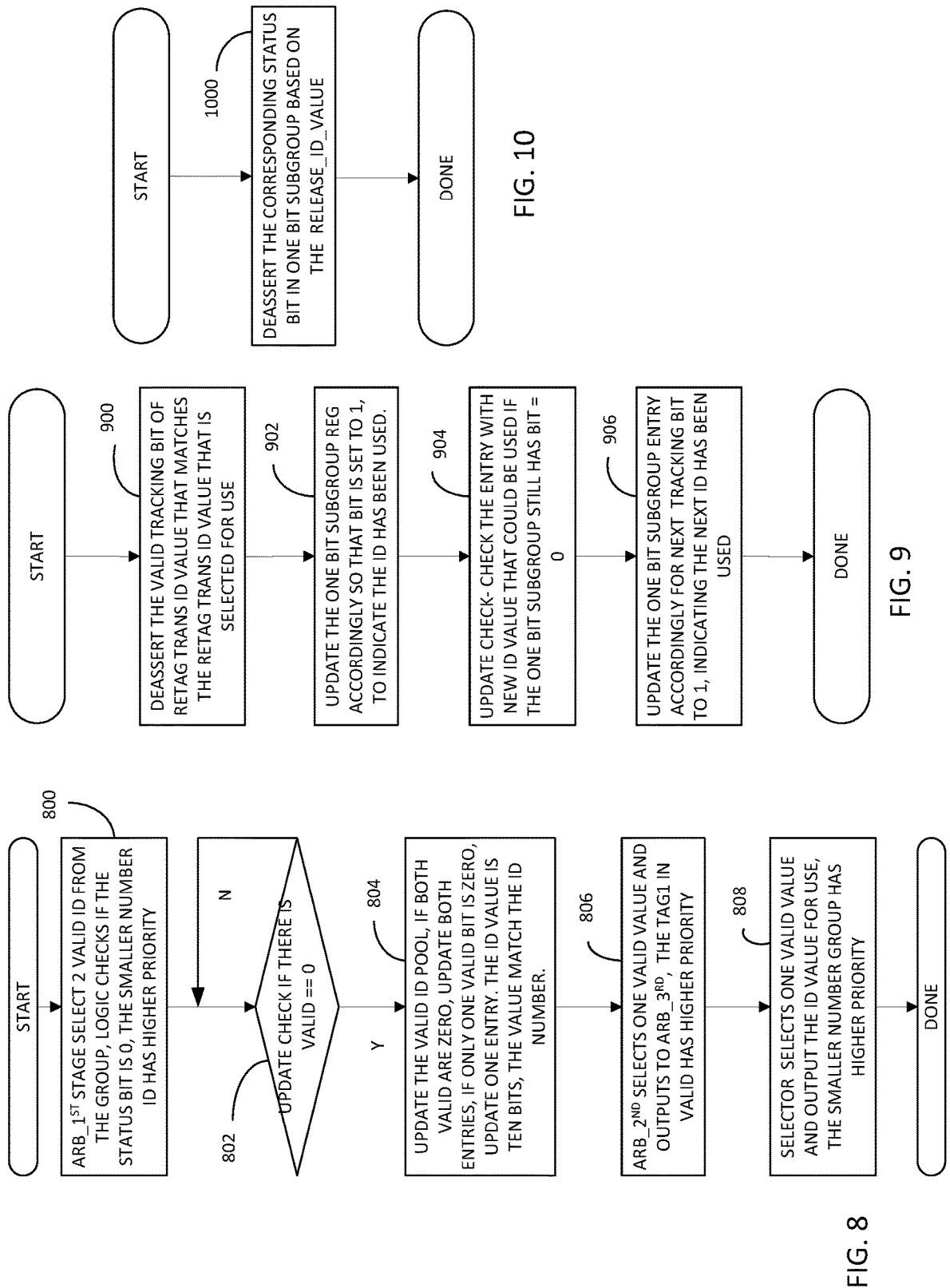

APPARATUS AND METHODS FOR MANAGING OUTSTANDING TRANSACTIONS BETWEEN ONE OR MORE REQUESTING UNITS AND A TARGET UNIT

BACKGROUND OF THE DISCLOSURE

Computing systems, such as cloud servers, machine learning systems or other computing systems employ host processors, such as processors executing instances of a Hypervisor, operating systems (OS) and/or applications and connect to peripheral devices, such as discrete graphics processors, hard disk drives, SDXI engines, universal serial bus (USB) devices, network interface cards and other peripheral clients through an expansion bus such as a peripheral component interconnect bus. The peripheral devices are also configured to operate as physical functions (PF) and virtual functions (VF) as part of virtual machine (VM) operation.

One example of a peripheral component interconnect bus is a peripheral component interconnect express (PCIE) bus that is based on point-to-point topology, with separate serial links connecting every device to the root complex (host). Interface logic (also referred to as Northbridge Interface (NBIF)) logic is used between the root complex and the PCIE infrastructure for different peripheral input/output (I/O) clients and data path hubs. For example, for each input/output client, that communicates with the host processor, the interface logic manages outstanding transactions pending between the host and clients and is in charge of providing the PCIE header and capability list for the transaction requests between the host and clients. Interface logic then takes charge of matching the transaction request between requesting units (also referred to as requesting clients) and the target host processor to PCIE behavior, such as function number identity, bus master enable check, access control services (ACS) check, device (D) state check, link reset handle, advanced error reporting (AER) handle, active state report and other behavior. The interface logic also provides error reports, timeout detection and interrupt messaging (INT/MSG) related to the transactions.

As the number of transaction requests from different clients increases, the integrated circuit die area of the interface logic needs to increase resulting in increased power consumption, increased circuit layout complexity and decreased performance due in part to latencies introduced in managing the increasing number of outstanding transactions.

BRIEF DESCRIPTION OF THE DRAWINGS

FIG. 8 is a flowchart illustrating a method for managing transaction requests between at least one requesting unit and at least one target unit in accordance with one example set forth in the disclosure.

FIG. 9 is a flowchart illustrating a method for managing transaction requests between at least one requesting unit and at least one target unit in accordance with one example set forth in the disclosure.

FIG. 10 is a flowchart illustrating a method for managing transaction requests between at least one requesting unit and at least one target unit in accordance with one example set forth in the disclosure.

Figure 1:
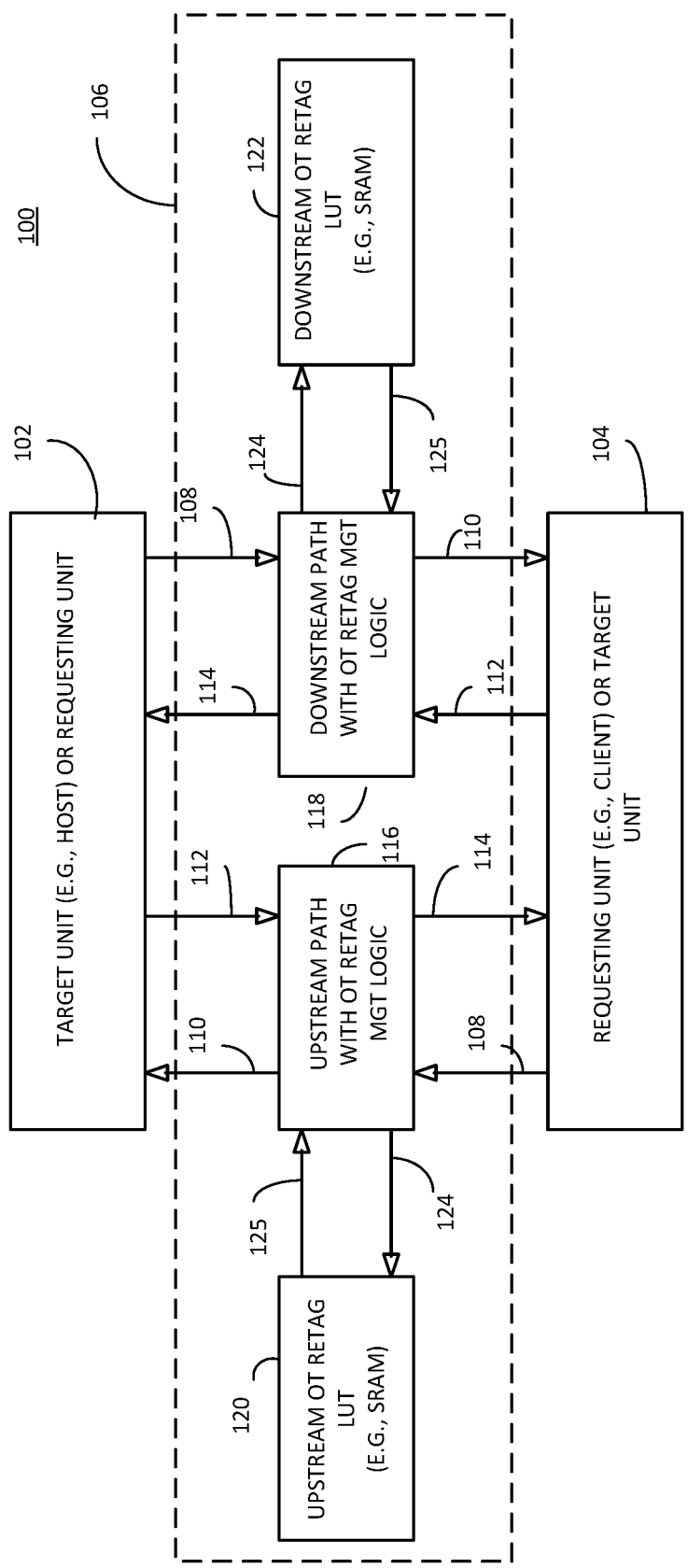
FIG. 1 illustrates a block diagram of an apparatus that manages transaction requests between a requesting unit and a target unit in accordance with one example set forth in the disclosure.

The implementations will be more readily understood in view of the below description when accompanied by the figures, wherein like reference numerals represent like elements. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

To perform management of the tasks for pending outstanding transactions, the interface logic needs to record the PCIE/transaction status and related information for each outstanding transaction request to match with a corresponding response when it is received from the target unit. The transaction information includes the PCIE physical function (PF)/virtual function (VF) number, routing target, transaction request ID, error status (err_status) and instance identifier (instance_ID). This data requires nearly 60 bits for each transaction. The information for each transaction also includes recording the unit ID of the requestor and transaction action identifier (ID) (also referred to as a tag) issued by the requestor, for each transaction request as the search key for a transaction request. When the interface logic needs to perform some action for one transaction, it uses the unit ID plus tags as a key to search through an entire table for the information. Existing implementations use a register composed of a hash table for storing information and the search key. That is, for each outstanding transaction request, current systems need nearly 80 registers. With the outstanding number of registers growing to hundreds or even more than one thousand, the die area cost becomes excessively large.

Also, to load information for a desired transaction, in conventional systems the interface logic needs to compare the value of the unit ID and transaction tag. For example, there may be 21 bits as a key for each transaction, and hundreds or even more than one thousand search keys. This can require large amounts of interconnects and compare logic on an integrated circuit die and becomes more complex as more transactions are issued as systems grow. The complexity also makes timing of getting requests and corresponding responses routed in a timely manner.

For example, such structures can be costly in terms increasing die size of the integrated circuit that employs the interface logic circuitry or other interfaces between multiple requesting units and one or more target units (e.g., processors), and/or adding power consumption, and/or adding design complexity to integrated circuits. Additionally, this may result in slower execution speed of the system employing such a structure. Systems employing such structures such as, for example, computer servers providing cloud-based machine learning operations and/or artificial intelligence operations, are particularly sensitive to increased costs due in part to die size increasing, increased power consumption and reduced speed of execution.

In some implementations, interface logic that serves as an interface between requesting units and target units, retags incoming (upstream and/or downstream) transaction requests and efficiently generates valid transaction retag request identifiers (IDs) (such as an available unused tag from a group of retag values) that are used to retag outstanding transactions by retagging incoming transactions between requesting clients that issue the transaction requests and one or more targets that respond to the transaction requests. When the target unit returns a response to the outstanding transaction for the requesting client, the retag request ID is then swapped out for an original incoming transaction request ID. The response, including the original transaction request ID, is sent back to the requesting client (also referred to as a requestor).

In certain implementations, the interface logic tracks used (e.g., hot) and valid (e.g., unused) retag transaction identifiers from a group of retag transaction identifiers. In certain implementations, retag transaction identifier assignment occurs from a fixed sized group of retag transaction identifiers that serve as indexes to corresponding original transaction IDs that are re-inserted in the response before the response is sent back to the requestor. In some implementations, the retag transaction identifier is an address to a memory location that contains a corresponding original transaction identifier and other original transaction information.

In some implementations, each retag transaction ID in the group can be reused after a response to the request comes back from a target. Each retag transaction ID is tracked using retag tracking data indicating whether a particular retag transaction ID in the group is already in use as part of an outstanding transaction or is available to be assigned to a new incoming transaction request. In order to efficiently assign retag transaction IDs from the group of retag transaction IDs, the retag tracking data is processed in sub-groups and a new retag transaction ID is selected for a new incoming transaction request based on the sub-groups of retag tracking data.

In some implementations, an apparatus includes logic circuitry that selects a retag transaction identifier for an original transaction identifier of an incoming transaction request, based on a plurality of sub-groups of retag tracking data wherein each sub-group of retag tracking data is associated with a corresponding sub-group of retag transaction identifiers in a group of retag transaction identifiers and retags the incoming transaction request with the selected retag transaction identifier (ID) by replacing the original transaction identifier associated with the incoming transaction request.

In certain implementations, the logic, in response to selecting the retag transaction ID, updates corresponding retag tracking data for the retag transaction ID to indicate use of the selected retag transaction ID from the group of retag transaction identifiers. In some implementations, the logic includes a plurality of registers each including retag tracking data associated with a respective sub-group of retag tracking data. The retag tracking data includes, for each corresponding retag transaction identifier in each respective sub-group, at least one bit indicating a status of whether a corresponding retag transaction identifier is available to be assigned as a new retag transaction identifier for a new incoming original transaction request.

In certain implementations, each retag transaction identifier includes data representing an address in memory that stores a corresponding original transaction identifier of a corresponding original transaction request. For example, a value of the retag transaction identifier is the address of the memory.

In some implementations, the logic further includes first retag ID assignment logic, associated with a first sub-group of retag tracking data, that selects a first valid retag transaction ID from a first corresponding sub-group of retag transaction identifiers, second retag ID assignment logic, associated with a second group of retag tracking data, that selects a second valid retag transaction ID from a second sub-group of retag transaction identifiers, and retag selection logic that selects one of the first valid retag transaction ID or the second valid retag transaction ID as a new retag transaction ID for a new incoming transaction request.

In some implementations, the logic includes a retag transaction look up table, used to manage outstanding transactions, that includes a plurality of original transaction requests indexed by a respective retag transaction identifier. In certain implementations, the logic replaces (e.g., swaps back) the retag transaction identifier with the original transaction identifier using the retag transaction identifier as a lookup address in the retag transaction look up table, for a response that is received that includes the retag transaction ID. In some implementations the retag transaction look up table includes both an upstream outstanding transaction retag transaction LUT and a downstream outstanding transaction retag transaction LUT.

In certain implementations, the logic sends a retagged incoming transaction request for at least one target unit; and in response to receiving a response to the sent retagged incoming transaction request, replaces the retag transaction identifier in the response with the original transaction identifier associated with the corresponding original incoming transaction request to produce a reply for a requesting client that originated the original incoming transaction request. The logic sends the reply for the requesting client.

In some implementations, a computer processing system includes a target processor and a plurality of requesting input/output (I/O) clients. An interface circuit, such as a peripheral component interface, is coupled to the target processor and to the plurality of requesting (I/O) clients. The interface logic retags incoming transaction requests from the requesting clients with internal tags and includes logic that selects a retag transaction identifier for an original transaction identifier of an incoming transaction request from at least one of the plurality of requesting I/O clients, based on a plurality of sub-groups of retag tracking data wherein each sub-group of retag tracking data is associated with a corresponding sub-group of retag transaction identifiers in a group of retag transaction identifiers. The interface logic retags the incoming transaction request with the selected retag transaction identifier (ID) by replacing the original transaction identifier associated with the incoming transaction request and sends a retagged incoming transaction request with the retag transaction identifier (ID) for the target processor.

In certain implementations, the logic, in response to selecting the retag transaction ID, updates corresponding retag tracking data for the retag transaction ID to indicate use of the selected retag transaction ID from the group of retag transaction identifiers. In some implementations, the logic includes a plurality of registers each including retag tracking data associated with a respective sub-group of retag tracking data. The retag tracking data includes, for each corresponding retag transaction identifier in each respective sub-group, at least one bit indicating a status of whether a corresponding retag transaction identifier is available (valid) to be assigned as a new retag transaction identifier for a new incoming original transaction request.

In certain implementations of the system, each retag transaction identifier includes data representing an address in memory that stores a corresponding original transaction identifier of a corresponding original transaction request.

In some implementations of the system, the logic manages retagging of outstanding transactions by using: first retag ID assignment logic, associated with a first sub-group of retag tracking data, that selects a first valid retag transaction ID from a first corresponding sub-group of retag transaction identifiers, second retag ID assignment logic, associated with a second group of retag tracking data, that selects a second valid retag transaction ID from a second sub-group of retag transaction identifiers, and retag selection logic that selects one of the first valid retag transaction ID or the second valid retag transaction ID as a new retag transaction ID for a new incoming transaction request. In some implementations, the first retag ID assignment logic and the second retag ID assignment logic each include a first arbitration stage configured to select a plurality of valid retag tracking data from a subgroup tracking register and a second arbitration stage configured to select among retag transaction IDs corresponding to the selected valid retag tracking data from the first arbitration stage.

In certain implementations, the system employs a retag transaction look up table, such as one or more of an upstream or downstream outstanding transaction retag look up table. The retag transaction look up table includes a plurality of original transaction requests indexed by a respective retag transaction identifier. The logic replaces the retag transaction identifier with the original transaction identifier using the retag transaction identifier as an address in the retag transaction look up table, for a response that is received from a target wherein the response includes the retag transaction ID. In some implementations, in response to receiving a response to a sent retagged incoming transaction request, the logic replaces the retag transaction identifier in the response with the original transaction identifier associated with the corresponding original incoming transaction request to produce a reply for a requesting client that originated the original incoming transaction request and sends the reply for the requesting client.

In certain implementations, a method for managing transaction requests between one or more requesting clients and at least one target unit includes: selecting a retag transaction identifier for an original transaction identifier of an incoming transaction request, based on a plurality of sub-groups of retag tracking data wherein each sub-group of retag tracking data is associated with a corresponding sub-group of retag transaction identifiers in a group of retag transaction identifiers; and retagging the incoming transaction request with the selected retag transaction identifier (ID) by replacing the original transaction identifier associated with the incoming transaction request.

In some implementations, the method includes generating retag tracking data that includes, for each corresponding retag transaction identifier in each respective sub-group, at least one bit indicating a status of whether a corresponding retag transaction identifier is available valid) to be assigned as a new retag transaction identifier for a new incoming original transaction request.

In certain implementations, the method includes using each retag transaction identifier as an address in memory that comprises a corresponding original transaction identifier of a corresponding original transaction request.

In some implementations, the method includes selecting a first valid retag transaction ID from a first corresponding sub-group of retag transaction identifiers corresponding to a first sub-group of retag tracking data; selecting a second valid retag transaction ID from a second sub-group of retag transaction identifiers corresponding to a second group of retag tracking data; and selecting one of the first valid retag transaction ID or the second valid retag transaction ID as a new retag transaction ID for a new incoming transaction request.

In certain implementations, the method includes producing a retag transaction look up table comprising a plurality of original transaction requests indexed by a respective retag transaction identifier. The method also includes replacing the retag transaction identifier with the original transaction identifier using the retag transaction identifier as an address in the retag transaction look up table, for a response that is received that includes the retag transaction ID.

In some implementations, the method includes: sending a retagged incoming transaction request for at least one target unit; and in response to receiving a response to a sent retagged incoming transaction request, replacing the retag transaction identifier in the response with the original transaction identifier associated with the corresponding original incoming transaction request to produce a reply for a requesting client that originated the original incoming transaction request; and sending the reply for the requesting client.

FIG. 1 is a block diagram illustrating one embodiment of a computer processing system 100, such as a system on chip, data center server, laptop, mobile phone, internet appliance, or other suitable device. One or more target units 102 are configured to execute instructions stored in system memory and in some examples, a target unit includes a central processing unit (CPU), graphics processing unit (GPU), accelerated processing units (APUs), machine learning unit, artificial intelligence unit or other suitable processing devices. Each of the units include, in some examples, a plurality of processing cores. One or more requesting units 104, issue transaction requests that request the target unit 102 to perform one or more operations. Interface logic 106 manages outstanding transactions between requesting units and target units. From an upstream communication direction, interface logic 106 receives an incoming transaction request 108 from the requesting unit 104 that includes an original transaction identifier and retags the incoming transaction request with a new internal tag, referred to as a retag transaction identifier (ID), and sends a retagged incoming transaction request 110 that includes the retag transaction ID to the target unit 102. The target unit 102 performs the transaction as requested and returns a response 112 that includes the retag transaction ID to the interface logic 106. The interface logic 106 replaces the retag transaction identifier in the response with the original transaction identifier and sends the response to the requesting unit (also referred to as an originator).

As shown in this example, the interface logic 106 includes outstanding transaction (OT) retag management logic 116 in an upstream path and outstanding transaction retag management logic 118 in a downstream path. However, it will be recognized that the functionality can be combined and/or distributed as desired. In some implementations, the interface logic 106 employs an upstream OT retag lookup table 120 and a downstream OT retag lookup table 122. Also, in some implementations, all client IDs share the same LUT. However, it will be recognized that other structures may be employed and the lookup tables may be combined into a single table or split into other desired formats. The interface logic 106 is implemented as electronic circuitry and in some implementations includes one or more of state machines, digital logic, memory, programmable gate arrays, programmable controllers or any suitable logic. However, it will be recognized that any suitable logic may be employed.

Figure 2:
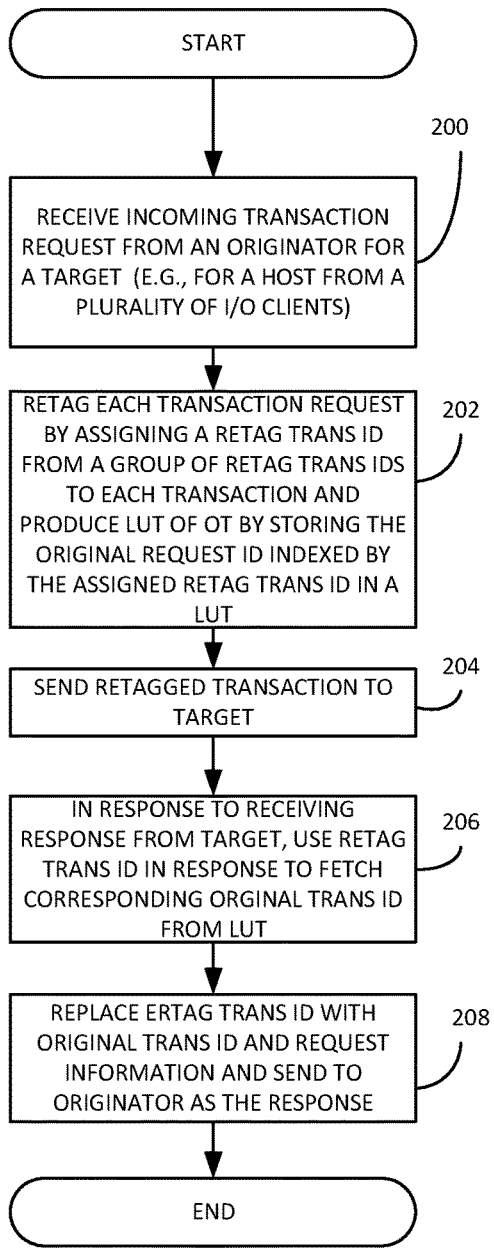
FIG. 2 is a flowchart illustrating a method for managing transaction requests between at least one requesting unit and at least one target unit in accordance with one example set forth in the disclosure.
Figure 7:
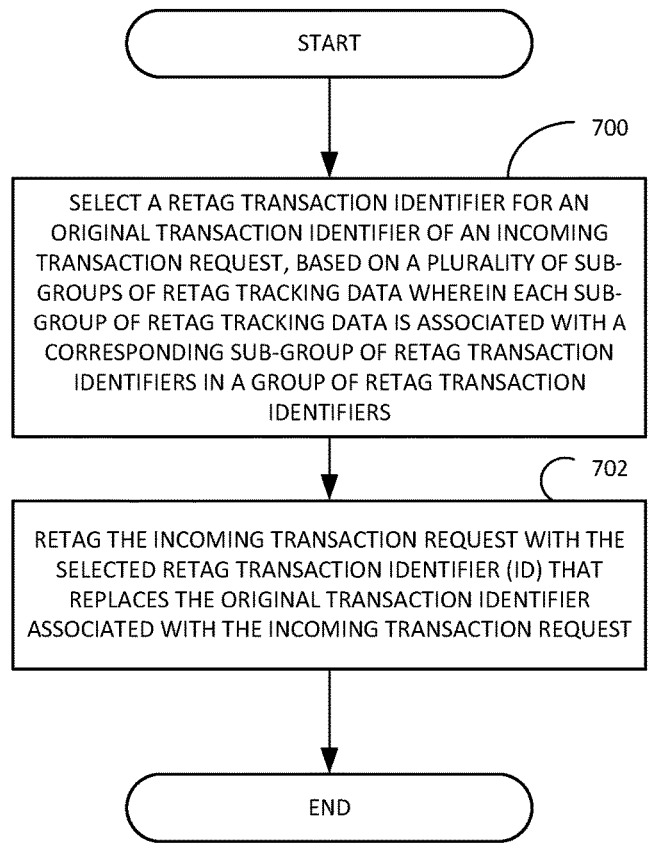
FIG. 7 is a flowchart illustrating a method for managing transaction requests between at least one requesting unit and at least one target unit in accordance with one example set forth in the disclosure.

Referring also to FIG. 2, a method for managing transaction requests between at least one requesting unit and at least one target unit is shown and will be described with reference to FIG. 1. It will be recognized however that any suitable structure may be used. It will also be recognized that the operations may be performed in any suitable order. The method is applicable in both an upstream communication path and a downstream communication path. In some implementations, a target unit can also become the requesting unit and a requesting unit can also become a target unit for transaction requests. In this example, an upstream path will be considered as the flow path where a client unit is the requesting unit 104 and originates the transaction request which is destined for a host processor that is the target unit. A downstream path will be considered as the flow path where a prior target unit, such as a host processor, becomes the requesting unit and originates the transaction request which is destined for a prior requesting unit 104 that becomes a target unit of transaction requests originated from the host.

As shown in block 200, the method includes receiving an incoming transaction request 108 from and originator such as requesting unit 104, for a target unit 102. In one example this is a transaction request for a host processor from one or more peripheral I/O clients. However, any suitable transaction request can be employed depending upon the type of system employed. As shown in block 202 the method includes retagging each incoming transaction request 108 by assigning a retag transaction ID from a group of retag transaction IDs to the incoming transaction request, as an internal tag to the transaction. In some implementations this is done by the OT retag management logic 116. In certain implementations, retagging incoming transactions includes producing the upstream OT retag look up table 120 that includes a plurality of original transaction requests indexed by a respective retag transaction identifier by storing at least original transaction IDs indexed by corresponding retag transaction IDs. For example, a retag entry 124 to a table entry in the OT retag LUT is made for outstanding transactions, by the OT retag management logic 116 where an assigned retag transaction ID serves as an address in the OT retag look up table 120 in memory that stores a corresponding original transaction ID that was issued by the requesting unit. In this example, the retag transaction ID includes a direct or indirect (e.g., pointer to the address) memory address.

As shown in block 204, after the original transaction ID is replaced with the retag transaction ID, the method includes sending a retagged incoming transaction request 110 for the target unit. The retagged incoming transaction request 110 includes the retag transaction ID, which is an internal tag issued by the OT retag transaction logic 116, and replaces the original transaction ID for that transaction request. As shown in block 206, the method includes receiving the response 112 to the transaction request from the target unit. The interface logic 106 performs error checking and rule compatibility and if the response 112 passes, the retag transaction ID is used to fetch (e.g., look up) the original transaction ID and information stored in the memory. As shown in block 208, in response to receiving the response 112 to the sent retagged incoming transaction request 110, the method includes replacing the retag transaction identifier in the response 112 with the original transaction identifier associated with the corresponding original incoming transaction request to produce a reply 114 for the requesting client that originated the original incoming transaction request. For example, the retag transaction ID in the response 112 is used as a value (address) to retrieve the corresponding original transaction ID 125 and associated information from the OT retag LUT 120. The reply 114 is sent for the requesting unit 104. The requesting client processes the reply 114 as needed. As such, the method includes replacing the retag transaction identifier with the original transaction identifier and sending the reply (response) with the original transaction ID to the requesting unit as the response to the incoming transaction request 108. In one example this includes using the retag transaction identifier as an address in the outstanding transaction retag look up table 120, for the response 112 that is received from the target unit 102, wherein the response 112 includes the retag transaction ID. The incoming transaction request 108 and the reply 114 include the original transaction ID whereas the retagged incoming transaction request 110 and the response 112 include the retag transaction ID. The same operations in FIG. 2 are carried out by the OT retag management logic 118 in the downstream path for transaction requests originating from the target unit 102 that becomes a requesting unit.

Figure 3:
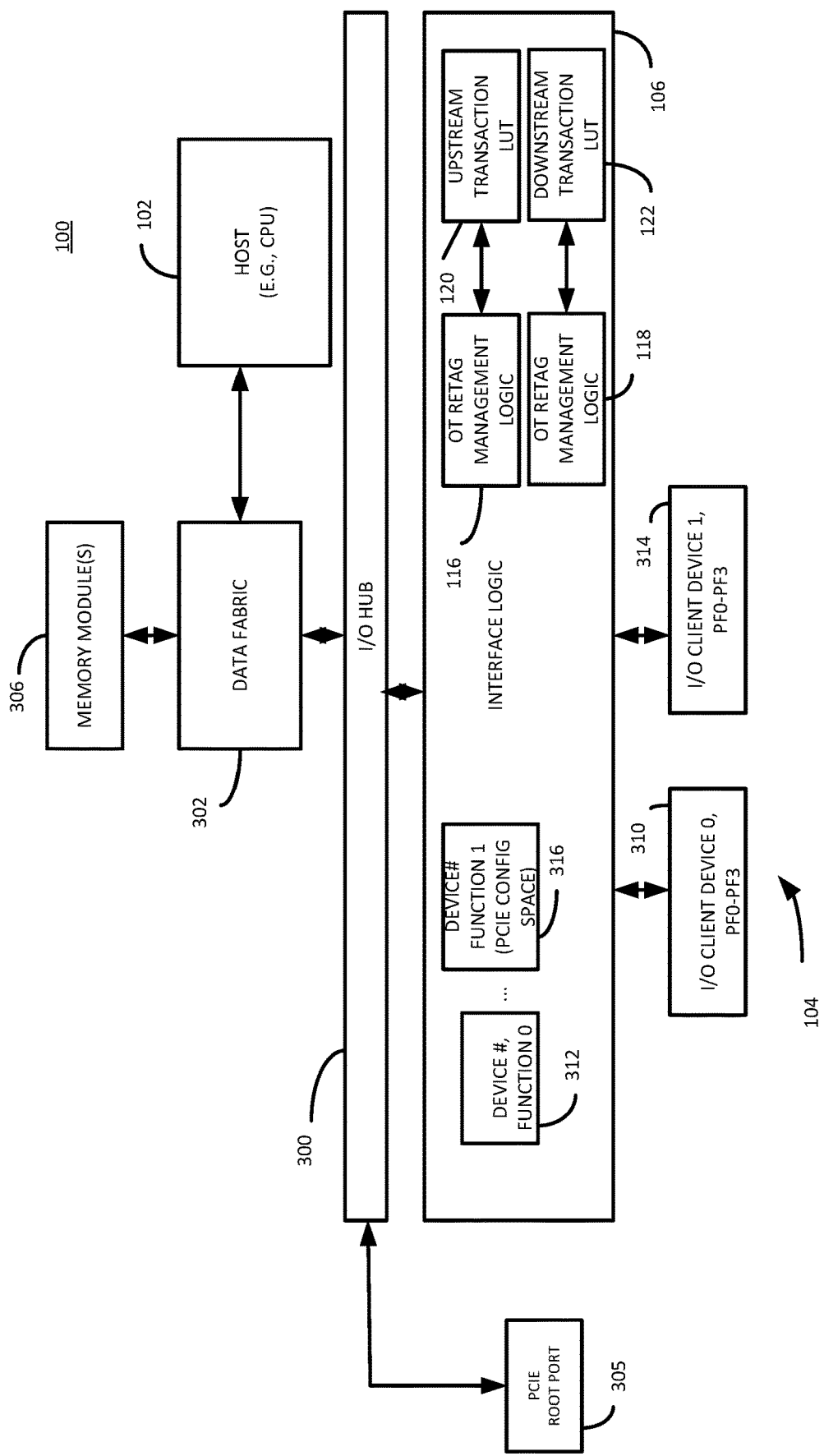
FIG. 3 illustrates a block diagram of an apparatus that manages transaction requests between at least one requesting unit and at least one target unit in accordance with one example set forth in the disclosure.

FIG. 3 illustrates a more particular example of a computer processing system 100, such as a data center server, for illustration purposes only, and it will be recognized that any suitable configuration may be employed. In this example, the target unit 102 includes a host target processor such as multi-core central processing unit, multi-core GPU, multi-core APU or any suitable processor that performs transactions requested by peripheral device requesting units 104. In this example, in an upstream flow, an I/O hub 300 gathers transactions from the interface logic that come from the requesting I/O clients 310 and 314 and from other PCIE root ports 305, and forwards the transaction requests to the target processor through a data fabric 302. The interface logic 106 has access to the PCIE configuration space for each device (including device functions) as shown by blocks 312 and 316. It will be recognized that the I/O hub need not be employed if desired. In this example the interface logic is an I/O peripheral component interface, however any suitable interface device may be employed.

In some examples, the client devices include discrete graphics processing units, USB devices, network interconnect device or other devices including identified virtual machines of the devices, identified functions (virtual and/or physical functions) of the devices that are connected to the host target through the peripheral component interconnect interface logic. The memory modules 306 can also serve as target units and/or requesting unit.

In some implementations, the interface logic 106 reports a requesting unit 104 as a PCIE device to the host and performs PCIE root checks and records the data in the OT retag LUT table indexed by the retag transaction ID. When a corresponding response is returned from the target, the interface logic checks the responses to see if there are errors and performs rule checks such as whether the responses obey PCIE rules. If the response passes the error check and rule checks, the response is retagged with the original transaction ID (retag transaction ID is replaced) and sent to the requesting unit. The interface logic 106 records the PCIE/transaction status and related information for each outstanding transaction request. In some implementations, the interface logic is the PCIE infrastructure for different requesting clients and data path hubs. For each PCIE client, the interface logic 106 is in charge of providing the PCIE header and capability list. The interface logic 106 then takes charge of matching the transaction request between clients and host to PCIE behavior. The interface logic 106 also provides error reports, timeout detections and interrupt and message (INT/MSG) generations for clients.

Figure 4:
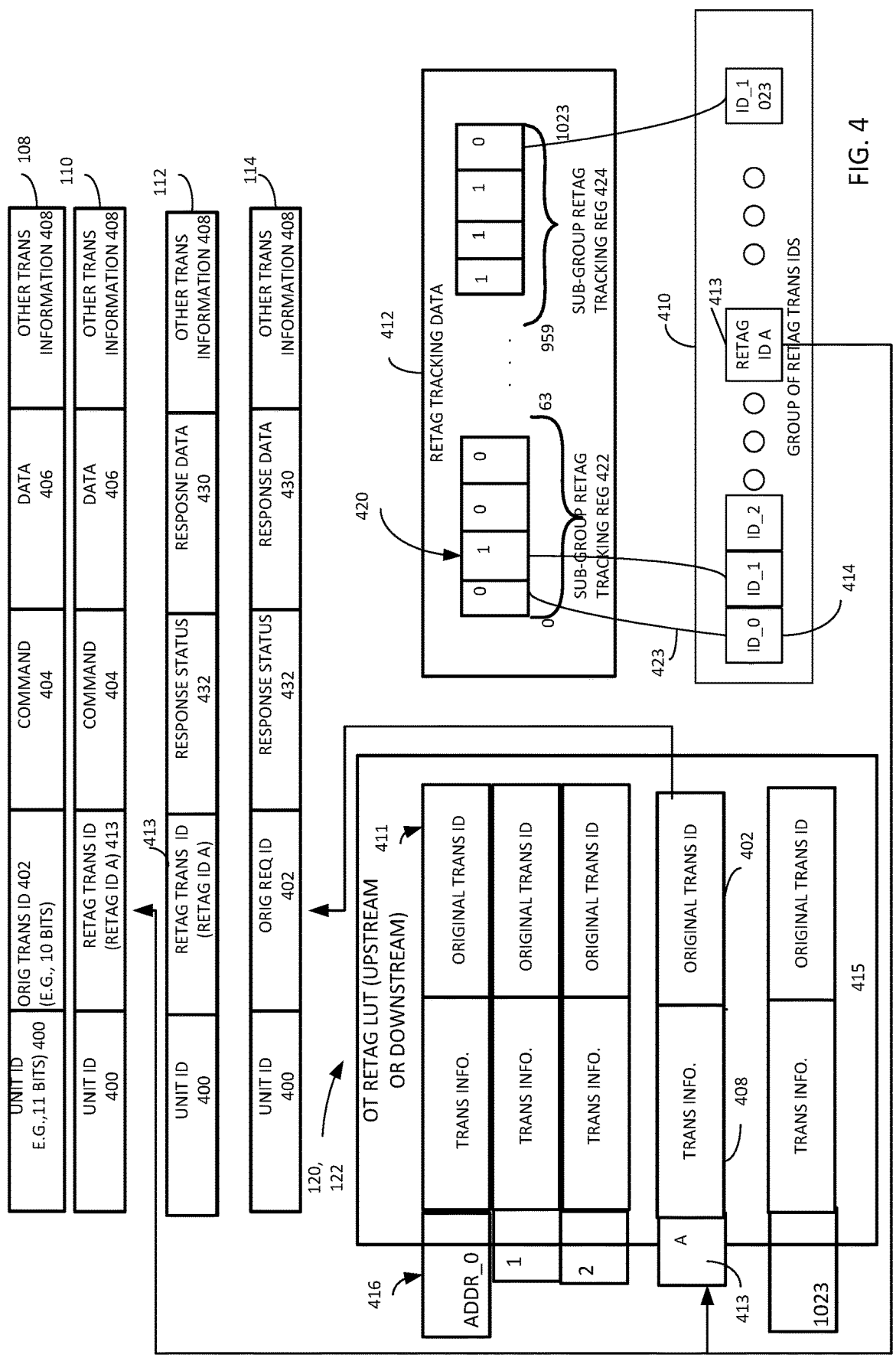
FIG. 4 is a diagram illustrating retag transaction ID tracking data and retag transaction ID management in accordance with one example set forth in the disclosure.

Referring to FIG. 4, a diagram illustrates an example of retag transaction ID tracking data and retag transaction ID management operations as provided by the interface logic 106 of the computer processing system 100. For convenience, upstream outstanding transaction request management will be described, but it will be recognized that similar operations are performed by the interface logic 106 for downstream transaction requests if they are generated. In this example, the incoming transaction request 108 is a conventional incoming transaction request and is packetized and includes data representing: a unit identifier 400 that identifies the requesting unit that issued the incoming transaction request, an original transaction identifier 402 that is generated by the requesting unit, one or more commands 404 for the target unit and associated data 406 for the target unit to use with the commands, and other transaction information, such as PCIE PV/VF identifiers, error status, instance ID or other suitable information.

The interface logic 106 manages a group of retag transaction identifiers (IDs) 410 and includes a plurality of sub-group retag tracking registers 412. In this example, the group of retag transaction identifiers 410 are a set of addresses 416 in memory 415, such as a static random access memory (SRAM) or other suitable memory configuration, addressable by the interface logic. In this example there are 1024 retag transaction IDs. In one example, a programmable configuration register in the interface logic 106 stores the address range the defines the group of retag transaction IDs. Each retag transaction ID 413 in this example includes data representing an address 416 in memory 415. In this example, the address is part of the OT retag LUT 120. Each address in the look up table stores a corresponding original transaction identifier 402 of a corresponding incoming transaction request 108.

The OT retag look up tables 120 and 122 include a plurality of original transaction requests 411 indexed by a respective retag transaction identifier 413. When a response 112 comes back from the target unit, the OT retag management logic 116, 118 generates the reply 114 by replacing the retag transaction identifier 413 in the response 112 with the original transaction identifier 402 using the retag transaction identifier 413 as an address lookup in the outstanding transaction retag look up table 120.

The sub-group retag tracking registers 412 include retag tracking data 420 that tracks usage of each retag transaction ID in the group of retag transaction IDs 410. In this example, one usage bit is used for each retag transaction ID in the group of retag transaction IDs 410. Accordingly, since there are 1024 retag transaction IDs in the group of retag transaction IDs 410, there are 1024 corresponding retag tracking bits that are stored in the sub-group retag tracking registers 412. As shown by line 423, each retag transaction ID 414 in the group of retag transaction IDs 410 has a corresponding usage value, shown as a "1" or "0". In this example, at least one bit indicates a status of whether a corresponding retag transaction identifier is available for assignment, also referred to as being "valid", to be assigned as a new retag transaction identifier for a new incoming original transaction request. However, it will be recognized that any suitable number of bits may be employed. In this example there are 16 sub-group retag tracking registers, two are shown as sub-group retag tracking registers 422 and 424. Each sub-group retag tracking register stores retag tracking data associated with a respective sub-group of retag tracking data. For example, in this example, sub-group retag tracking register 422 stores 64 bits of retag tracking data out of 1024 retag tracking bits corresponding to the 1024 retag transaction IDs that are available for selection as retag transaction IDs. The interface logic 106 efficiently assigns retag transaction IDs from the group of retag transaction IDs. The retag tracking data is quickly processed in sub-groups and a new retag transaction ID is selected for a new incoming transaction request based on the sub-groups of retag tracking data.

Figure 5:
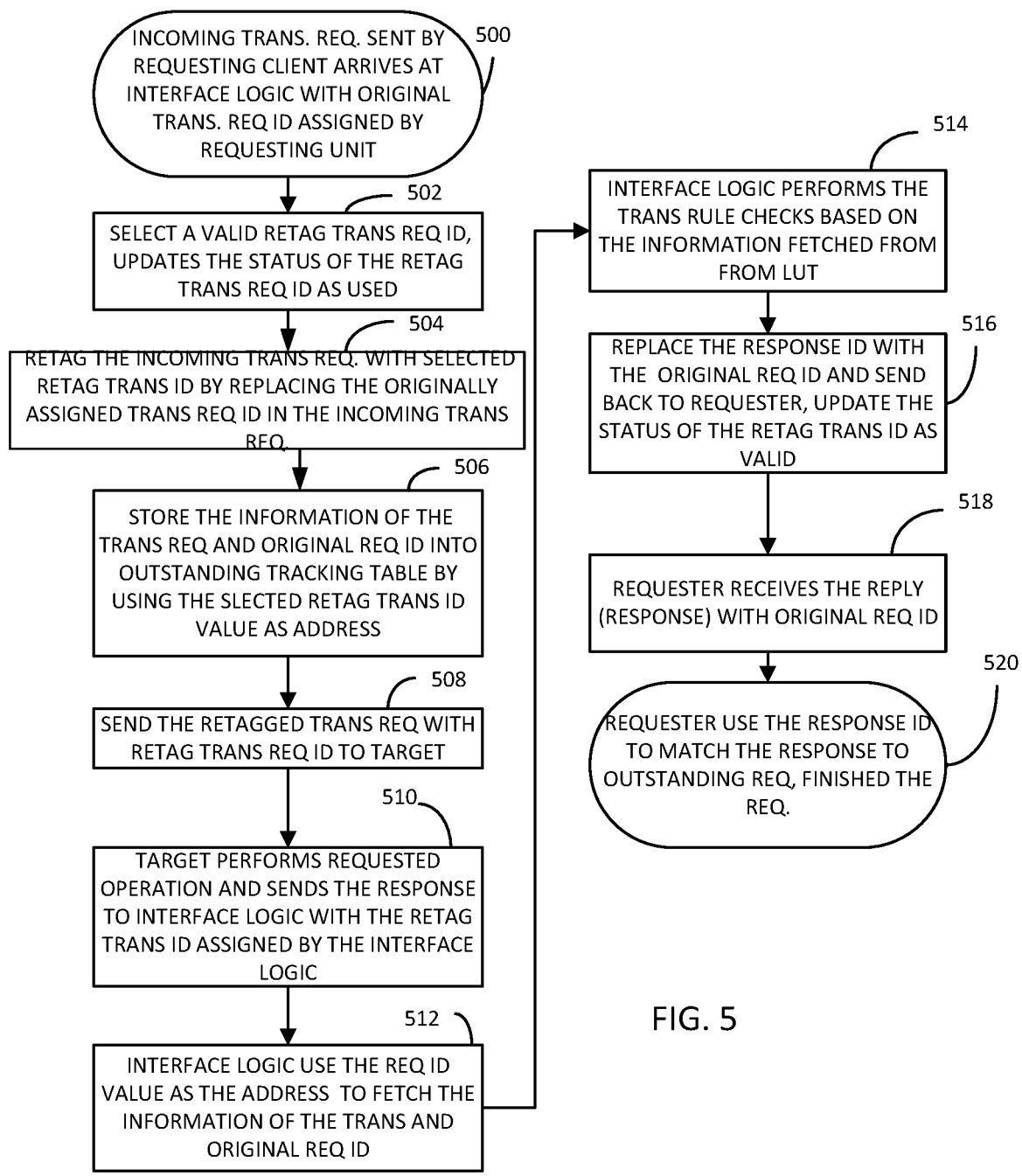
FIG. 5 is a flowchart illustrating a method for managing transaction requests between at least one requesting unit and at least one target unit in accordance with one example set forth in the disclosure.

Referring also to FIG. 5, a method for managing transaction requests between at least one requesting unit and at least one target unit is shown and will be described with reference to FIGS. 1-4. It will be recognized that the operations may be performed in any suitable order. As shown in block 500, the method includes the interface logic 106 receiving the incoming transaction request 108 from a requesting unit 104, such as requesting I/O client 310 that assigns the original transaction ID 402. As shown in block 502, the interface logic 106 selects a valid retag transaction identifier 413 (retag ID A) from the group of retag transaction IDs 410 for the incoming transaction request 108 and in response to selecting the retag transaction ID 413, updates the status of the selected retag transaction identifier 413 as used, in a corresponding sub-group retag tracking register. This includes updating the corresponding retag tracking data for the selected retag transaction ID 413 in the corresponding sub-group retag tracking register to indicate use of the selected retag transaction ID from the group of retag transaction identifiers. In this example, the retag tracking data is set to a "0" for the corresponding retag transaction identifier 413 indicating that the retagged transaction identifier 413 is available or valid to be assigned to another incoming transaction request. A "1" indicates that a retag transaction ID is not valid and is unavailable for assignment to a new incoming transaction. It will be recognized that the logic can be reversed if desired.

As shown in block 504, the method includes generating the retagged incoming transaction request 110 by retagging the incoming transaction request 108 with the selected retag transaction identifier 413 by replacing the original transaction identifier 402 associated with the incoming transaction request. As shown in block 506 the method includes storing the transaction information 408 and the original transaction identifier 402 from the incoming transaction request 108 into the outstanding transaction retag lookup table 120 (or OT retag LUT 122 in a downstream operation) by using the selected retag transaction ID 413 is an address into the lookup table. As shown in block 508, the method includes sending the retagged incoming transaction request 110 for the target unit. As shown in block 510, the method includes the target unit, such as the host target processor, performing the requested operation identified in the retagged incoming transaction request 110 and sending the response 112 to the interface logic 106 wherein the response 112 includes the retag transaction ID 413. The response 112 also includes the response data 430 resulting from the requested operation and response status data 432 indicating whether the target had problems with the requested operation. As shown in block 512 the method includes the interface logic 106 using the retag transaction ID in the response 112 as an address to the OT retag LUT 120 to fetch the transaction information 408 and the original transaction ID 402. As shown in block 514, the method includes the interface logic 106 performing transaction rule checks, such as PCIE rule checks based on the transaction information 408 retrieved from the OT retag lookup table in memory.

As shown in block 516, the method includes in response to receiving the response 112, the interface logic 106 replaces the read tag transaction identifier 413 in the response 112 with the original transaction identifier 402 to produce a reply 114 for the requesting client that originated the incoming transaction request 108. The reply is then sent by the interface logic for the requesting client. As shown in block 518, the requesting client receives the reply 114 which includes the original transaction ID 402. As shown in block 520 the method includes the requesting client using the original transaction ID 402 in the reply 114 to match with outstanding transaction requests of the requesting client. If a match is found to the original transaction request ID 402, the requesting client considers the request completed.

Figure 6:
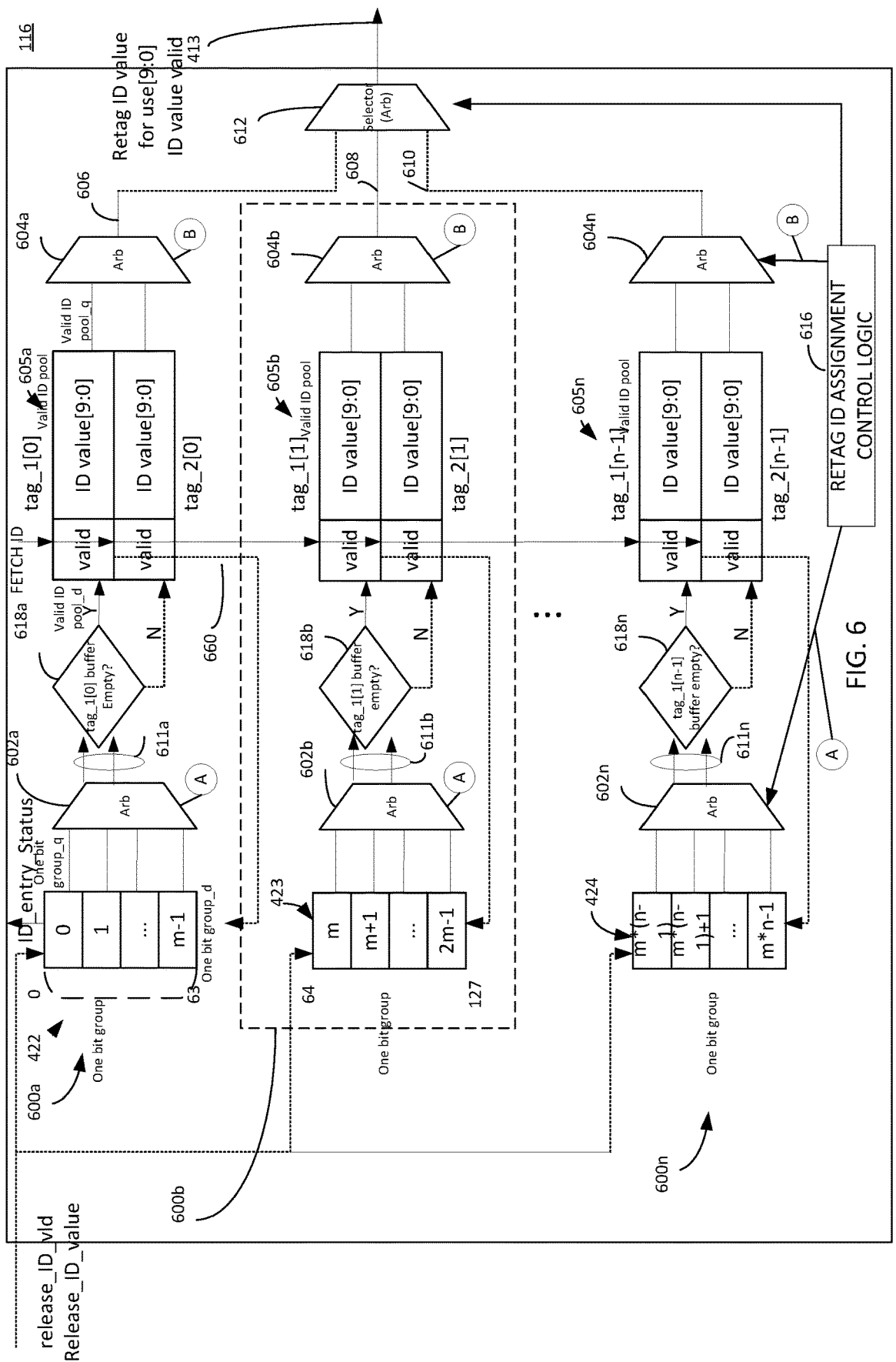
FIG. 6 illustrates a block diagram of outstanding transaction retag management logic that manages selection of retag transaction identifiers based on retag tracking data in accordance with one example set forth in the disclosure.

Referring to FIG. 6 an example of outstanding transaction retag management logic 116 is shown. Similar structure is duplicated for a downstream path if desired. In this example, sets of retag ID assignment logic 600a-600n each output a selected valid retag transaction ID. For example, retag ID assignment logic 600a outputs a selected valid (available for assignment) retag transaction ID 606, retag ID assignment logic 600b outputs a selected valid retag transaction ID 608 and retag ID assignment logic 600n outputs a selected valid retag transaction ID 610. Each group of retag ID assignment logic is associated with a sub-group of retag tracking data, and selects a valid retag transaction ID from each of a corresponding sub-group of retag transaction identifiers. For example, retag ID assignment logic 600a is associated with the sub-group of retag tracking data 0-63 in retag tracking register 422, and selects a valid retag transaction ID 606 from the corresponding sub-group of retag transaction identifiers 0-63 in the group of retag transaction IDs 410. Retag selection logic 612 selects one of the valid retag transaction IDs 606, 608 or 610 as a new retag transaction ID for a new incoming transaction request.

Each set of retag ID assignment logic 600a-600n includes a first arbitration stage 602a-602n and a second arbitration stage 604a-604n. Retag transaction ID storage registers 605a-605n store candidate retag transaction request IDs. The first arbitration stage selects valid retag tracking data 611a-611n from a sub-group retag tracking data register 422-424 and the second arbitration stage selects a valid retag transaction ID 606-610 based on the selected valid retag tracking data and passes on the selected retag transaction ID to the retag selection logic 612 which serves as a third stage of arbitration. The outstanding transaction retag management logic 116 also includes retag assignment control logic which controls the arbitration stages and register access to output a selected retag transaction ID on each clock cycle if desired.

For example, retag ID assignment logic 600a includes a first arbitration stage 602a and a second arbitration stage 604a. Retag transaction ID storage registers 605a store candidate retag transaction request IDs (also referred to as a valid ID pool) that correspond to selected valid retag tracking data 611a from the sub-group retag tracking data register 422. The second arbitration stage 604a selects a valid retag transaction ID 606 based on the selected valid retag tracking data 611a and passes on the selected valid retag transaction ID 606 to the retag selection logic 612. Comparator logic 618a determines whether selected valid retag tracking data 611a is still a "0" after being selected by the first arbitration stage 602a. Each of the other sets of the retag ID assignment logic include similar structure as shown. Retag assignment control logic 616 controls the arbitration stage 602a, 604a and 612, comparator logic 618a-618n and register access to output a selected retag transaction ID on each clock cycle if desired. In some implementations the retag assignment control logic is implemented as one or more state machines, combinational digital logic or any other suitable structure. In other implementations, the retag assignment control logic is implemented a programmed controller; however any suitable logic circuitry may be employed.

In one example, the retag tracking data is stored in the sub-group registers 422-424 each one group has a 64 bit register, each bit represent one retag ID's usage status. As noted above, a "0" means a corresponding retag transaction ID is available (valid) to be used as a new retag transaction ID for a new incoming transaction. A "1" means the corresponding retag transaction ID is already being used as a retag transaction ID and is not available for assignment to an incoming transaction. As shown in this example, one sub-group register is for tracking data for 0 to m−1 retag transaction identifiers from the pool of 1024 retag transaction identifiers and records the valid status for retag transaction IDs from 0 to m−1 in the pool of retag transaction IDs. By sub-grouping the 1K number of retag status data into several small groups, a search for a valid retag ID to use for a new assignment is done at a high speed for all retag IDs in the pool (group). The m and n is parameter, easy to configure the design to support various numbers of retag transaction IDs, also is flexible to adjust the design and balance the timing and die area. In one example, m=64 and n=16 to support 1K (1024) retag ID numbers.

Referring also to FIGS. 7-10, the operation of FIG. 6 will be described. As shown in block 700, the interface logic 106 and in this example the OT retag management logic 116, selects a retag transaction identifier 413 for an original transaction identifier 402 of an incoming transaction request 108, based on a plurality of sub-groups of retag tracking data, such as the retag tracking data in each of the sub-group retag tracking registers 422-424. Each sub-group of retag tracking data is associated with a corresponding sub-group of retag transaction identifiers in the group of retag transaction identifiers 410. As shown in block 702, the method includes retagging the incoming transaction request 108 with the selected retag transaction identifier 413 by replacing the original transaction identifier 402 associated with the incoming transaction request 108. As such the retagged incoming transaction request 110 is generated and sent to the target unit.

As shown in FIG. 8, the method includes as shown in block 800, the first arbitration stage 602a selects two valid retag tracking data entries as the selected retag tracking data 611*a* from the sub-group of retag tracking data (0-63 single bit location entries) in the sub-group retag tracking registers 422. For example, the first arbitration stage 602*a* check if each of the retag tracking status bits in the sub-group is "0". If more than two are detected to be "0" then the smaller identifier entry number of the retag tracking status bit has higher priority and is passed to the comparator logic 618*a*. For example, if retag tracking data in register entry locations 2, 6, 33 and 38 of the 0-63 entries in the subgroup are all "0" indicating that their corresponding retag transaction IDs are valid candidates to use to retag an incoming transaction request, bit entry locations 2 and 6 are given priority and passed as valid retag tracking data 611*a*. As shown in block 802 the method includes performing an update to check to see if either of the two selected retag tracking data 611*a* bits are still marked as valid="0". As shown in block 804, for example, the behavior of the arbitration stage 602*a* is confirmed, and the comparator checks to see if the valid bit in register 605*a* has a zero. If both valid bits in entries in registers 605*a* are 1, the checked result is kept. For those that are still valid, the corresponding retag transaction identifiers (referred to as ID_value [9:0]) are loaded in the retag transaction ID storage registers 605*a* (also referred to as valid pool registers) along with their retag tracking data. For example, the retag ID assignment control logic 616 updates the retag transaction ID storage registers 605*a*, if both selected bits of the selected tracking data 611*a* are valid=0, then both registers are updated with corresponding retag transaction IDs. If only one of the selected bits is still valid=0, then just one corresponding entry is updated with the corresponding retag transaction ID. The retag selection logic 612, such as an arbiter, selects one valid value and outputs the value as the retag ID value for use. The smaller numbered group has the higher priority. For example, as shown in block 806, each of the arbiters 604*a*-604*n* select a valid retag ID 606, 608, 610 to output to the retag selection logic 612. As shown in block 808 the retag selection logic 612 receives multiple valid retag IDs 606-610 from multiple arbiters 604*a*-604*n* and selects one valid retag ID from the multiple valid tags and then outputs the selected one as ready to be used. If none of the two retag tracking bits indicate invalid usage status, the next selected retag tracking bits from the sub-group retag tracking registers are checked.

Referring again to block 806, the method includes the second arbitration stage 604*a* selecting one of the available retag transaction IDs from the valid pool of two retag transaction IDs from the retag transaction ID storage registers 605*a* as the retag transaction ID 413 to use to retag the incoming transaction request. In this example, the smaller number retag transaction ID gets the priority. For example, the retag transaction ID corresponding to address 6 in the group of retag transaction IDs 410 would get priority over address 64. Similar operations occur for each of the sets of retag assignment logic.

Referring also to FIG. 9, as part of a fetch (also referred to as a pop) to select a retag transaction ID, as shown in block 900, the OT retag management logic 116 de-asserts the valid bit of retag transaction ID value that match the retag transaction ID value for use. As shown in block 902 the method includes updating the one bit subgroup bit value to 1, to indicate the retag transaction ID has been used. As shown in block 904 the method includes checking to see if an entry in the registers 605*a* can be updated with a new retag transaction ID value if the associated one bit in the subgroup still has a bit=0. As shown in block 906 the method includes updating a corresponding entry in the one bit subgroup bit to 1, to indicate that the new retag transaction ID has been used.

Referring to FIG. 10, releasing of a retag transaction ID back into an available group to be used occurs as shown in block 1000, by the logic 116 de-asserting or changing a corresponding retag tracking status bit to a "0" after the reply 114 has been sent or after the retag transaction ID 413 in the response 112 has been used to fetch the corresponding original transaction ID 402 from the OT retag LUT 120. In one implementation, as shown by arrow 660 (FIG. 6), de-assertion of valid in the subgroup register will assert the corresponding bit in ID_entry_status. Each status bit represents one retag ID usage status, when a release signal is issued, each bit needs to know if the release ID number is targeted to it. The release_ID_vld=1 means there is a retag ID that needs to be released, the Release_ID_value shows the retag ID number that is needed to be released. So each single bit register uses both values (release_ID_vld and Release_ID_value). The ID_entry_status signal is output to external logic, to show the detailed status for all entry usage and may be stored as retag tracking data in a register or memory.

Among one or more technical benefits, in some implementations, a new structure for implementing outstanding tracking (OT) transactions, such as PCIE information, through the interface logic is disclosed. The disclosed retagging and use of memory such as SRAM, brings large die area savings by replacing hash register tables used in conventional systems with, in some examples, an SRAM and retagging transactions in the interface logic. This results in die area savings of the interface logic tile. This new structure increases power efficiency and improves performance.

As noted above the interface logic replaces the original transaction request tag from clients with a new tag assigned by the interface logic, in some implementations the new tag identifies the address for a lookup table address. When the transaction request come back to the interface logic from the target, the interface logic uses the new tag to fetch the information that belongs to this transaction, performs the PCIE check, then replaces the new tag with the original tagged and sends the original tag back to the requesting client. With the tag replacement operation, interface logic does not need to match the unitID/tag value with up to 1K entries as in conventional systems, and instead uses retagging with the retag transaction ID as the address in a look-up table, such as SRAM, to replace hash table registers to save a large die area and improve timing.

The memory needed is much smaller than using a register hash table for a same storage capacity. And with retagging, there is no need to store the search key for the address for the replaced transaction tag. As more transactions are received (as more entries are needed), the memory size increase does not bring timing issues compared to adding growing hash table sizes in conventional systems. Also, in some implementations, the retag fetch cycle is fixed so the performance is improved. In addition, memory, such as SRAM or other suitable memory, consumes much less power compared with a register hash table for the same storage capacity.

Although features and elements are described above in particular combinations, each feature or element can be used alone without the other features and elements or in various combinations with or without other features and elements. The apparatus described herein in some implementations use software or firmware stored on a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). The data stored on the non-transitory computer readable storage medium can then be used (i.e., executed) to create systems (e.g., boards, integrated circuits) that implement various embodiments of the invention.

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An apparatus comprising:
   an interface circuit, operative to interface with a plurality of requesting clients, comprising circuitry configured to:
      select a retag transaction identifier for an original transaction identifier of an incoming transaction request from at least one of the plurality of requesting clients, based on a plurality of sub-groups of retag tracking data wherein each sub-group of the plurality of sub-groups of retag tracking data is associated with a corresponding sub-group of retag transaction identifiers in a group of retag transaction identifiers; and
      retag the incoming transaction request with the selected retag transaction identifier (ID) by replacing the original transaction identifier associated with the incoming transaction request.

2. The apparatus of claim 1 wherein the interface circuit is further operative to, in response to selecting the retag transaction ID, update corresponding retag tracking data for the retag transaction ID to indicate use of the selected retag transaction ID from the group of retag transaction identifiers.

3. The apparatus of claim 1 comprising a plurality of registers each register comprising retag tracking data associated with a respective sub-group of retag tracking data, and wherein the retag tracking data comprises, for each corresponding retag transaction identifier in each respective sub-group, at least one bit indicating a status of whether a corresponding retag transaction identifier is available to be assigned as a new retag transaction identifier for a new incoming transaction request.

4. The apparatus of claim 1 wherein each retag transaction identifier comprises data representing an address in memory that comprises a corresponding original transaction identifier of a corresponding incoming transaction request.

5. The apparatus of claim 1 wherein the interface circuit further comprises:
   first retag ID assignment logic, associated with a first sub-group of retag tracking data, and operative to select a first valid retag transaction ID from a first corresponding sub-group of retag transaction identifiers;
   second retag ID assignment logic, associated with a second group of retag tracking data, and operative to select a second valid retag transaction ID from a second sub-group of retag transaction identifiers; and
   retag selection logic operative to select one of the first valid retag transaction ID or the second valid retag transaction ID as a new retag transaction ID for a new incoming transaction request.

6. The apparatus of claim 4 comprising a retag transaction look up table comprising a plurality of incoming transaction requests indexed by a respective retag transaction identifier and wherein the interface circuit is further operative to replace the retag transaction identifier with the original transaction identifier using the retag transaction identifier as an address in the retag transaction look up table, for a response that is received comprising the retag transaction identifier.

7. The apparatus of claim 1 wherein the interface circuit is operative to:
   send a retagged incoming transaction request for at least one target unit;
   in response to receiving a response to a sent retagged incoming transaction request, replace the retag transaction identifier in the response with the original transaction identifier associated with the corresponding original incoming transaction request to produce a reply for a requesting client that originated the original incoming transaction request; and
   send the reply for the requesting client.

8. A computer processing system comprising:
   a target processor:
   a plurality of requesting input/output (I/O) clients; and
   an interface circuit, operatively coupled to the target processor and to the plurality of requesting (I/O) clients, and operative to:
      select a retag transaction identifier for an original transaction identifier of an incoming transaction request from at least one of the plurality of requesting I/O clients, based on a plurality of sub-groups of retag tracking data wherein each sub-group of retag tracking data is associated with a corresponding sub-group of retag transaction identifiers in a group of retag transaction identifiers;
      retag the incoming transaction request with the selected retag transaction identifier (ID) by replacing the original transaction identifier associated with the incoming transaction request;

send a retagged incoming transaction request with the retag transaction identifier (ID) for the target processor;

in response to receiving a response to a sent retagged incoming transaction request, replace the retag transaction identifier in the response with the original transaction identifier associated with the corresponding original incoming transaction request to produce a reply for a requesting client that originated the original incoming transaction request; and send the reply for the requesting client.

9. The system of claim 8 wherein the interface circuit is further operative to, in response to selecting the retag transaction ID, update corresponding retag tracking data for the retag transaction ID to indicate use of the selected retag transaction ID from the group of retag transaction identifiers.

10. The system of claim 8 comprising a plurality of registers each comprising retag tracking data associated with a respective sub-group of retag tracking data, and wherein the retag tracking data comprises, for each corresponding retag transaction identifier in each respective sub-group, at least one bit indicating a status of whether a corresponding retag transaction identifier is available to be assigned as a new retag transaction identifier for a new incoming transaction request.

11. The system of claim 8 wherein each retag transaction identifier comprises data representing an address in memory that comprises a corresponding original transaction identifier of a corresponding incoming transaction request.

12. The system of claim 8 wherein the interface circuit further comprises:

first retag ID assignment logic, associated with a first sub-group of retag tracking data, and operative to select a first valid retag transaction ID from a first corresponding sub-group of retag transaction identifiers;

second retag ID assignment logic, associated with a second group of retag tracking data, and operative to select a second valid retag transaction ID from a second sub-group of retag transaction identifiers; and retag selection logic operative to select one of the first valid retag transaction ID or the second valid retag transaction ID as a new retag transaction ID for a new incoming transaction request.

13. The system of claim 11 comprising a retag transaction look up table comprising a plurality of incoming transaction requests indexed by a respective retag transaction identifier and wherein the interface circuit is further operative to replace the retag transaction identifier with the original transaction identifier using the retag transaction identifier as an address in the retag transaction look up table, for a response that is received comprising the retag transaction ID.

14. The system of claim 12 wherein the first retag ID assignment logic and the second retag ID assignment logic each comprises a first arbitration stage configured to select a plurality of valid retag tracking data from a subgroup tracking register, and a second arbitration stage configured to select among retag transaction IDs corresponding to the selected plurality of valid retag tracking data from the first arbitration stage.

15. A method for managing transaction requests between at least one requesting unit and at least one target unit, the method comprising:

selecting a retag transaction identifier for an original transaction identifier of an incoming transaction request, based on a plurality of sub-groups of retag tracking data wherein each sub-group of the plurality of sub-groups of retag tracking data is associated with a corresponding sub-group of retag transaction identifiers in a group of retag transaction identifiers; and retagging the incoming transaction request with the selected retag transaction identifier (ID) by replacing the original transaction identifier associated with the incoming transaction request.

16. The method of claim 15 comprising generating retag tracking data that comprises, for each corresponding retag transaction identifier in each respective sub-group of transaction identifiers, at least one bit indicating a status of whether a corresponding retag transaction identifier is available to be assigned as a new retag transaction identifier for a new incoming transaction request.

17. The method of claim 15 comprising using each retag transaction identifier as an address in memory that comprises a corresponding original transaction identifier of a corresponding incoming transaction request.

18. The method of claim 15 further comprising:

selecting a first valid retag transaction ID from a first corresponding sub-group of retag transaction identifiers corresponding to a first sub-group of retag tracking data;

selecting a second valid retag transaction ID from a second sub-group of retag transaction identifiers corresponding to a second group of retag tracking data; and selecting one of the first valid retag transaction ID or the second valid retag transaction ID as a new retag transaction ID for a new incoming transaction request.

19. The method of claim 18 comprising producing a retag transaction look up table comprising a plurality of incoming transaction requests indexed by a respective retag transaction identifier and replacing the retag transaction identifier with the original transaction identifier using the retag transaction identifier as an address in the retag transaction look up table, for a response that is received comprising the retag transaction.

20. The method of claim 15 further comprising:

sending a retagged incoming transaction request for at least one target unit;

in response to receiving a response to sending the retagged incoming transaction request, replacing the retag transaction identifier in the response with the original transaction identifier associated with the corresponding original incoming transaction request to produce a reply for a requesting client that originated the original incoming transaction request; and sending the reply for the requesting client.

* * * * *